(12) United States Patent
Johnsen et al.

(10) Patent No.: US 7,860,096 B2
(45) Date of Patent: Dec. 28, 2010

(54) SWITCHING METHOD AND APPARATUS FOR USE IN A COMMUNICATIONS NETWORK

(75) Inventors: Bjorn Dag Johnsen, Oslo (NO); Christopher Jackson, Westford, MA (US); David Brean, Boston, MA (US); Ola Tørudbakken, Oslo (NO); Steinar Forsmo, Oslo (NO); Hans Rygh, Oslo (NO); Morten Schanke, Oslo (NO)

(73) Assignee: Oracle America, Inc., Redwood Shores, CA (US)

( * ) Notice: Subject to any disclaimer, the term of this patent is extended or adjusted under 35 U.S.C. 154(b) by 1208 days.

(21) Appl. No.: 10/862,970

(22) Filed: Jun. 8, 2004

(65) Prior Publication Data

US 2006/0002385 A1 Jan. 5, 2006

(51) Int. Cl.
*H04L 12/28* (2006.01)
(52) U.S. Cl. ............................. 370/392; 370/389
(58) Field of Classification Search ................ 370/392, 370/462, 395.4; 714/4
See application file for complete search history.

(56) References Cited

U.S. PATENT DOCUMENTS

| | | | |
|---|---|---|---|
| 4,551,833 A | 11/1985 | Turner | |
| 4,896,319 A * | 1/1990 | Lidinsky et al. | ............. 370/427 |
| 5,812,195 A | 9/1998 | Zhang | |
| 5,956,102 A | 9/1999 | Lane | |
| 6,115,376 A | 9/2000 | Sherer | |
| 6,201,829 B1 | 3/2001 | Schneider | |
| 6,289,015 B1 | 9/2001 | Warner | |
| 6,304,196 B1 | 10/2001 | Copeland | |
| 6,393,082 B1 | 5/2002 | Nakamura | |
| 6,407,682 B1 | 6/2002 | Jones | |
| 6,459,698 B1 | 10/2002 | Acharya | |
| 6,570,884 B1 | 5/2003 | Connery | |
| 6,606,328 B1 | 8/2003 | Susnow | |
| 6,718,392 B1 | 4/2004 | Krause | |
| 6,839,794 B1 | 1/2005 | Schober | |

(Continued)

FOREIGN PATENT DOCUMENTS

WO 02089405 A2 11/2002

(Continued)

OTHER PUBLICATIONS

"InfiniBand Architecture Specification vol. 2, Release 1.1", Nov. 6, 2002.

(Continued)

*Primary Examiner*—Kwang B Yao
*Assistant Examiner*—Syed Bokhari
(74) *Attorney, Agent, or Firm*—Park, Vaughan, Fleming & Dowler LLP (57) ABSTRACT

One embodiment of the invention provides a method of operating a switch in a communications network. The method includes storing a set of routings for each port in the switch. When a packet is received at a port in the switch, the set of routings corresponding to the port at which the packet was received is accessed. A port from which to forward the packet from the switch is determined in accordance with the set of routings. The packet is then duly forwarded over the network from the port as determined by the routings.

30 Claims, 9 Drawing Sheets

U.S. PATENT DOCUMENTS

| | | | |
|---|---|---|---|
| 6,851,059 B1 | 2/2005 | Pfister | |
| 6,898,752 B2 | 5/2005 | Tucker | |
| 6,920,106 B1 | 7/2005 | Chou | |
| 6,922,749 B1 | 7/2005 | Gil | |
| 6,988,161 B2 | 1/2006 | McConnell | |
| 7,010,607 B1 | 3/2006 | Bunton | |
| 7,020,160 B1 | 3/2006 | Achler | |
| 7,061,899 B2 | 6/2006 | Walker | |
| 7,072,343 B1 | 7/2006 | Waclawsky | |
| 7,103,626 B1 | 9/2006 | Recio | |
| 7,113,995 B1 | 9/2006 | Beukema | |
| 7,124,241 B1 | 10/2006 | Reeve | |
| 7,133,409 B1 | 11/2006 | Willardson | |
| 7,150,021 B1 | 12/2006 | Vajhala | |
| 7,180,862 B2 | 2/2007 | Peebles | |
| 7,185,062 B2 | 2/2007 | Lolayekar | |
| 7,221,650 B1 | 5/2007 | Cooper | |
| 7,225,467 B2 | 5/2007 | Dapp | |
| 7,237,016 B1 | 6/2007 | Schober | |
| 7,245,627 B2 | 7/2007 | Goldenberg | |
| 7,302,432 B2 | 11/2007 | Brown | |
| 7,474,666 B2 | 1/2009 | Kloth | |
| 7,493,409 B2 | 2/2009 | Craddock | |
| 2001/0037435 A1 | 11/2001 | Van Doren | |
| 2001/0056553 A1* | 12/2001 | Suzuki et al. | 714/4 |
| 2002/0057699 A1 | 5/2002 | Roberts | |
| 2002/0087383 A1* | 7/2002 | Cogger et al. | 705/10 |
| 2002/0101967 A1* | 8/2002 | Eng et al. | 379/114.01 |
| 2002/0118692 A1 | 8/2002 | Oberman | |
| 2002/0147947 A1 | 10/2002 | Mayweather | |
| 2002/0150106 A1 | 10/2002 | Kagan | |
| 2002/0181455 A1 | 12/2002 | Norman | |
| 2003/0005039 A1 | 1/2003 | Craddock | |
| 2003/0021230 A1 | 1/2003 | Kuo | |
| 2003/0061379 A1 | 3/2003 | Craddock | |
| 2003/0079019 A1 | 4/2003 | Lolayekar | |
| 2003/0093627 A1 | 5/2003 | Neal | |
| 2003/0161429 A1 | 8/2003 | Chiang | |
| 2003/0188056 A1 | 10/2003 | Chemudupati | |
| 2003/0193942 A1 | 10/2003 | Gil | |
| 2003/0198251 A1* | 10/2003 | Black et al. | 370/462 |
| 2003/0200315 A1 | 10/2003 | Goldenberg | |
| 2003/0223416 A1 | 12/2003 | Rojas | |
| 2003/0223435 A1 | 12/2003 | Gil | |
| 2003/0223453 A1 | 12/2003 | Stoler | |
| 2003/0236900 A1 | 12/2003 | Chu | |
| 2004/0001487 A1 | 1/2004 | Tucker | |
| 2004/0001503 A1 | 1/2004 | Manter | |
| 2004/0022245 A1 | 2/2004 | Forbes | |
| 2004/0022257 A1 | 2/2004 | Green | |
| 2004/0024903 A1 | 2/2004 | Costatino | |
| 2004/0039986 A1 | 2/2004 | Solomon | |
| 2004/0071134 A1* | 4/2004 | Vadivelu | 370/373 |
| 2004/0073534 A1 | 4/2004 | Robson | |
| 2004/0081394 A1 | 4/2004 | Biran | |
| 2004/0085977 A1 | 5/2004 | Gaur | |
| 2004/0090964 A1* | 5/2004 | Reed et al. | 370/395.4 |
| 2004/0120254 A1 | 6/2004 | Rider | |
| 2004/0213224 A1* | 10/2004 | Goudreau | 370/389 |
| 2004/0215848 A1 | 10/2004 | Craddock | |
| 2004/0225734 A1* | 11/2004 | Schober et al. | 709/225 |
| 2004/0252685 A1 | 12/2004 | Kagan | |
| 2005/0011465 A1 | 1/2005 | Park | |
| 2005/0058150 A1 | 3/2005 | Boles | |
| 2005/0071472 A1 | 3/2005 | Arndt | |
| 2005/0108395 A1 | 5/2005 | Brey | |
| 2005/0138368 A1 | 6/2005 | Sydir | |

FOREIGN PATENT DOCUMENTS

WO          03075477 A2      9/2003

OTHER PUBLICATIONS

"InfiniBand Architecture Specification vol. 1, Release 1.1", Nov. 6, 2002.

Xilinx: "Virtex-II Pro Platform FPGAs: Functional Description", Product Specification, Dec. 10, 2003, pp. 1-5, XP-002348226.

PCT International Search Report for International Application No. PCT/US2005/016775, 4 pages.

Written Opinion of the International Search Authority for International Application No. PCT/US2005/016775, 5 pages.

3GPP Infiniband Specification Release 1.0a, Jun. 19, 2001, pp. 2, 62, 71, 155-156, 182-186 and 193-194.

Bu, Long et al., "A Keyword Match Processor Architecture using Content Addressable Memory", GLSVLSI'04, Apr. 26-28, 2004, Boston, Massachusetts, ACM, pp. 372-376.

* cited by examiner

SWITCHING METHOD AND APPARATUS FOR USE IN A COMMUNICATIONS NETWORK

RELATED APPLICATIONS

The present application is related to the following applications, all of which are filed on the same day and assigned to the same assignee as the present application:

"SWITCH METHOD AND APPARATUS WITH CUT-THROUGH ROUTING FOR USE IN A COMMUNICATIONS NETWORK" Ser. No 10/863,016, Inventors: Bjorn Dag Johnsen, Hans Rygh and Morten Schanke;

"METHOD AND APPARATUS FOR VERIFYING SERVICE LEVEL IN A COMMUNICATIONS NETWORK" Ser. No. 10/863,019, Inventors: Bjorn Dag Johnsen, Christopher Jackson, David Brean and Ola Torudbakken;

"METHOD AND APPARATUS FOR SOURCE AUTHENTICATION IN A COMMUNICATIONS NETWORK" Ser. No. 10/863,854, Inventors: Bjorn Dag Johnsen, Christopher Jackson, David Brean, Ola Torudbakken;

"CREDIT ANNOUNCEMENT" Ser. No. 10/863,373, Inventors: Morten Schanke, Hans Rygh, Marius Hansen and Mathias Hoddevik;

"ADAPTIVE CUT-THROUGH ALGORITHM" Ser. No. 10/862,987, Inventors: Morten Schanke, Brian Manula and Magne Sandven;

"COMMA DETECTION" Ser. No. 10/863,374, Inventors: Magne Sandven, Morten Schanke and Brian Manula;

"SERVICE LEVEL TO VIRTUAL LANE MAPPING" Ser. No. 10/862,985, Inventors: Steinar Forsmo, Hans Rygh and Ola Torudbakken;

"INPUT AND OUTPUT BUFFERING" Ser. No. 10/863,038, Inventors: Hans Rygh, Morten Schanke, Ola Torudbakken and Steinar Forsmo;

"CODEC IMPLEMENTATION FOR INFINIBAND" Ser. No. 10/863,439, Inventors: Steinar Forsmo, Mathias Hoddevik and Magne Sandven;

"VCRC CHECKING AND GENERATION" Ser. No. 10/863,013, Inventors: Steinar Forsmo, Hans Rygh, Morten Schanke and Ola Torudbakken;

"COMMUNITY SEPARATION ENFORCEMENT" Ser. No. 10/863,544, Inventors: Ola Torudbakken and Bjorn Dag Johnsen;

"STUMPING MECHANISM" Ser. No. 10/863,372, Inventors: Brian Manula, Ali Bozkaya and Magne Sandven.

The above-identified applications are all hereby incorporated by reference into the present application.

FIELD OF THE INVENTION

The present invention relates to communications networks, and in particular to switching packets through such networks.

BACKGROUND OF THE INVENTION

The security of data communications networks is become increasingly important. As more and more sensitive data is transmitted over such networks, it is very important that data belonging to one user on the network does not somehow become exposed or visible to another user on the network. In addition, as organisations place ever greater reliance on the availability of networks for conducting their business and other operations, a network must be robust against hardware and software errors, component down-time, abnormal traffic conditions, and so on.

Some network problems may be innocent (i.e. non-malicious) in origin. For example, they may be caused by a hardware failure, a software bug, or some other weakness. In other cases, an adversary may try to cause network problems deliberately with malicious intent, such as for motives of terrorism, commercial gain, political persuasion, etc. Depending upon the motives of the attack, the particular objective may be to obtain inappropriate access to data communications over the network, or to induce non-availability or some other non-functioning of the network. A malicious attack may exploit a known weakness in the network, and/or the attack may attempt to generate problems by the deliberate injection of errors, anomalous traffic, and so on.

It is therefore important for a network to be reliable and secure, and to be as resistant as possible against problems, whether deliberate or otherwise. In addition, it is also important for a network to be able to operate quickly and without delays.

SUMMARY OF THE INVENTION

Accordingly, one embodiment of the invention provides a method of operating a switch in a communications network, such as an InfiniBand network. The method comprises storing a set of routings for each port in the switch and receiving a packet at a port in the switch. The routings corresponding to the port at which the packet was received are accessed to determine a port from which to forward the packet from the switch. The packet is then forwarded over the network from the determined port.

In one embodiment, the set of routings for a port are stored in a routing table, and each port in the switch includes its own routing table. Alternatively, the routings for each different port may be stored together centrally somewhere in the switch (but differentiated at least in part by port).

In one embodiment, the routings map destination identifiers to output ports, so that a destination identifier is extracted from a received packet and used to access a set of routings. Certain destination identifiers may be marked in the routings as invalid for a port. In this case packets received at the port are discarded if the destination identifier extracted from the packet is indicated as invalid. Marking a destination identifier as invalid may be done with a control bit, or by indicating some special output port for that destination identifier that does not correspond to a legal output port (e.g. because it represents the port at which the packet was received).

In one embodiment, a packet progresses through the switch by being forwarded from the port where the packet is received to an output buffer of each output port on the switch. A receive enable signal is then transmitted to the output buffer corresponding to the particular port from which the packet is to be forwarded onto the network.

Another embodiment of the invention provides a switch for use in a communications network. The switch comprises multiple ports for connection to the network, and has a stored set of routings for each of the multiple ports. The switch further includes control logic for receiving a packet at a port in the switch, and accessing the set of routings corresponding to the port at which the packet was received. This allows the control logic to determine a port from which to forward the packet from the switch in accordance with the routings.

It will be appreciated that the switch embodiment of the invention will generally benefit from the same particular features as the method embodiment of the invention described above.

Another embodiment of the invention provides a multi-port networking switch operable to detect a destination of an incoming packet and to compare the detected destination to known destinations to determine an output port of the switch for retransmission of the packet. Data regarding the set of known destinations is maintained at each port of the switch.

Another embodiment of the invention provides an Infini-Band switch comprising a plurality of port pairs. Each port pair comprises an input port and an output port. Each input port comprises a retriever for retrieving a destination address from a received packet and a comparator for comparing the retrieved destination address to a set of known destination addresses to select a target output port for the packet. Data regarding the set of known destination addresses can be stored at each input port.

All ports may have a copy of the same routing data, or different ports may have different (i.e. port-specific) routing data. Having multiple copies of routing data at different ports (whether port-specific or not) helps to avoid delays in forwarding a packet through a switch (compared to having to consult a single central set of routing data). In particular, this approach avoids having to wait for signals to reach a central forwarding table and also removes any possible contention between different input ports simultaneously attempting to access a single shared table. This is achieved without requiring a significant increase in integrated circuit real-estate, since the additional space taken up by having multiple instances of the table is offset by the removal of a need for contention handling mechanisms.

BRIEF DESCRIPTION OF THE DRAWINGS

Specific embodiments of the present invention will now be described by way of example only with reference to the accompanying figures in which:

FIG. 5 is a schematic illustration of the layers of an Infini-Band Architecture system.

DETAILED DESCRIPTION

1) The InfiniBand Architecture

The InfiniBand architecture provides a standard computer networking environment defined and administered by the InfiniBand Trade Association, which was founded by Compaq, Dell, Hewlett-Packard, IBM, Intel, Microsoft and Sun Microsystems (InfiniBand is a trademark of the InfiniBand Trade Association; other names are trademarks of their respective companies). The InfiniBand Architecture defines a System Area Network (SAN) for connecting multiple independent processor platforms (i.e. host processor nodes), I/O platforms and I/O devices. A full definition of the InfiniBand Architecture may be found in the InfiniBand Architecture Specification Volumes 1 and 2, available from the InfiniBand Trade Association (www.lnfiniBandta.org), and which is hereby incorporated hereinto by reference.

An InfiniBand Architecture system area network (SAN) provides a communications and management infrastructure supporting both I/O and interprocessor communications for one or more computer systems. An InfiniBand Architecture system can range from a small server with one processor and a few I/O devices to a massively parallel supercomputer installation with hundreds of processors and thousands of I/O devices.

The InfiniBand Architecture defines a switched communications fabric allowing many devices to communicate concurrently with high bandwidth and low latency in a protected, remotely managed environment. An end node can communicate over multiple InfiniBand Architecture ports and can utilise multiple paths through the InfiniBand Architecture fabric. A multiplicity of InfiniBand Architecture ports and paths through the network are provided both for fault tolerance and for increased data transfer bandwidth.

Figure 1:
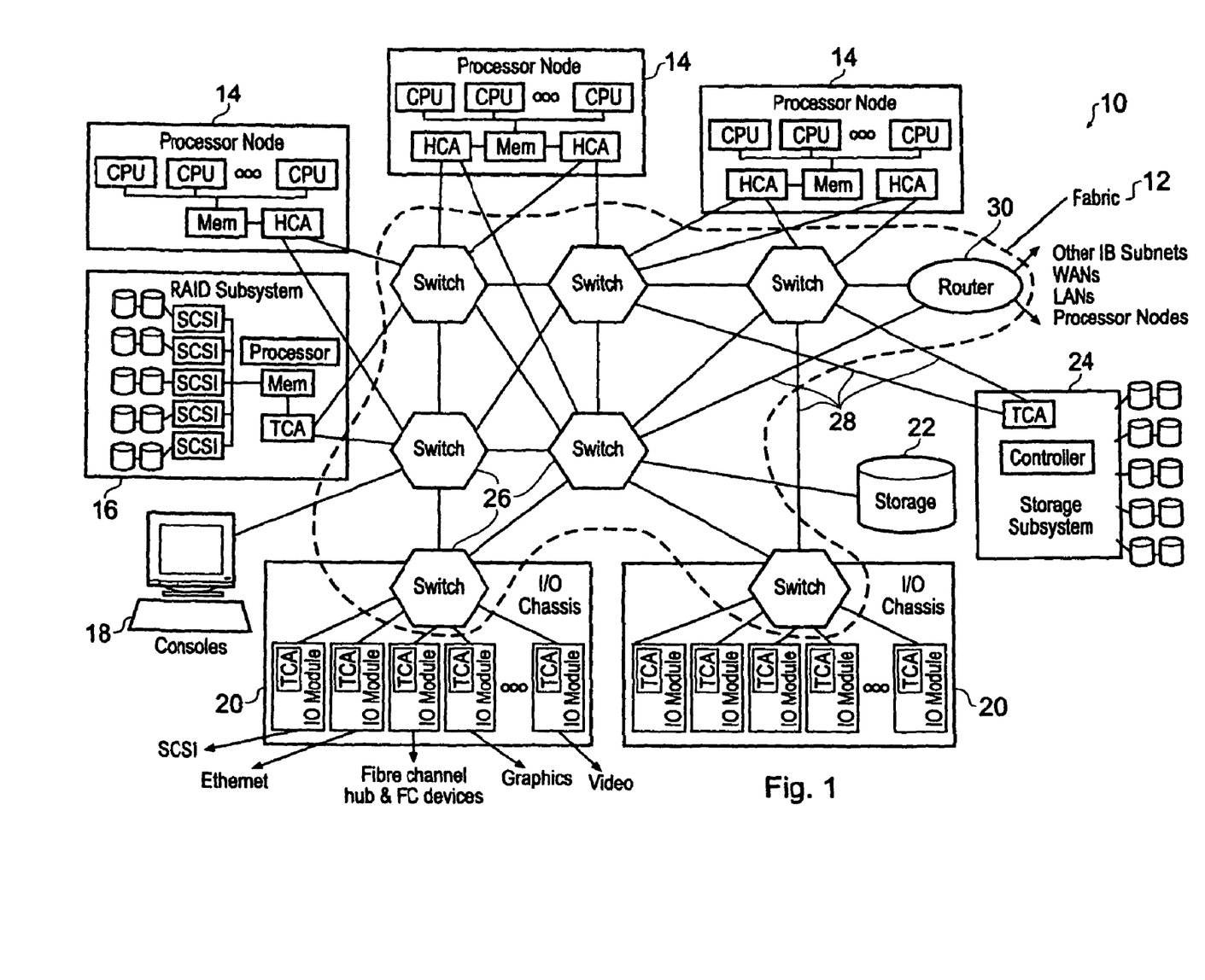
FIG. 1 is a schematic block diagram showing an example of interconnection of computing system elements via the Infini-Band networking architecture.

An example of an InfiniBand Architecture system area network is shown in FIG. 1. As can be seen from FIG. 1, the system area network 10 comprises an InfiniBand Architecture fabric (or subnet) 12 made up of cascaded switches and routers. The fabric 12 provides links between a number of processor nodes 14 and other nodes including a RAID subsystem 16, consoles 18, I/O chassis 20, storage 22 and a storage subsystem 24. The fabric 12 comprises a plurality of switches 26 with InfiniBand links 28 providing data connections between the switches 26 and between the nodes attached to the fabric 12. Also included in the fabric 12 is a router 30 for providing connections to and from other networks, which may be other InfiniBand Architecture subnets, non-Infini-Band Architecture LANs and WANs, and/or processor nodes. I/O units connected via the fabric 12 may range in complexity from single ASIC devices such as a SCSI (small computer systems interface) or LAN adapter to large memory rich RAID subsystems that rival a processor node in complexity. Collectively, the processor nodes 14, RAID subsystem 16, consoles 18, I/O chassis 20, storage 22 and storage subsystems 24 are known as end nodes 32.

Each endnode 32 includes a channel adapter, which may be a Host Channel Adapter (HCA) or a Target Channel Adapter (TCA). Host Channel Adapters are found in processor nodes 14, and Target Channel Adapters are found in I/O nodes 16, 18, 20, 22 and 24. Host Channel Adapters are configured to issue requests across the fabric 12, and Target Channel Adapters are configured to respond to such requests, for example by supplying requested data or storing supplied data.

Each channel adapter uses a queuing system based on Queue Pairs, one queue for send operations and one for receive operations. Each queue pair may therefore be considered to provide a virtual communication port for a channel adapter. Each channel adapter may have up to $2^{24}$ Queue Pairs, which may be assigned individually or in combination to handle communications involving different parts (or consumers) of the end node 32. For example, a processor node 16 may comprise a plurality of processors and each processor may have one or more individual Queue Pairs assigned to handle requests and responses flowing to and from that particular processor of the processor node via fabric 12. Alternatively, or in addition, a processor of a given processor node 16 may be running more than one process and each process may have one or more Queue Pairs assigned to handle requests and responses flowing to and from that process via the fabric 12.

The interconnects 28 may be one of three classes, 1x, 4x or 12x, referring to the number of parallel lanes making up that interconnect. Each lane is a single serial connection over a single physical signal carrier path (whether electrical or optical). Thus the bandwidth available to each interconnect is defined by a combination of the number of lanes and the maximum data rate of the physical signal carrier making up each lane.

Figure 2:
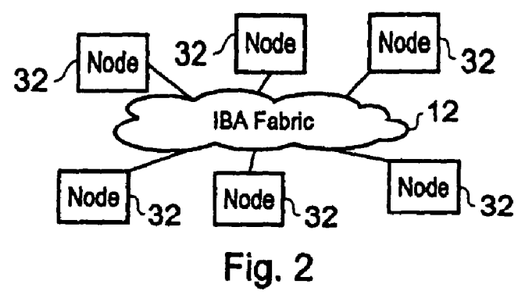
FIG. 2 is a schematic block diagram of a simplified arrangement of an InfiniBand Architecture system.
Figure 3:
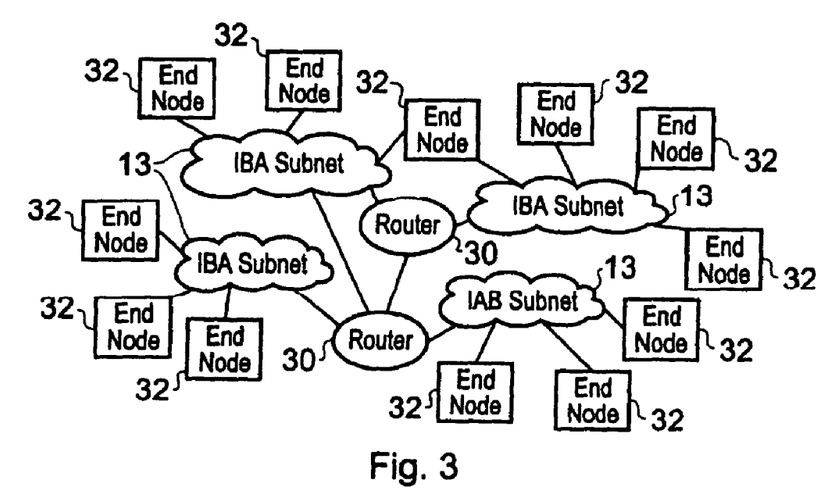
FIG. 3 is a schematic block diagram of another simplified arrangement of an InfiniBand Architecture system.
Figure 4:
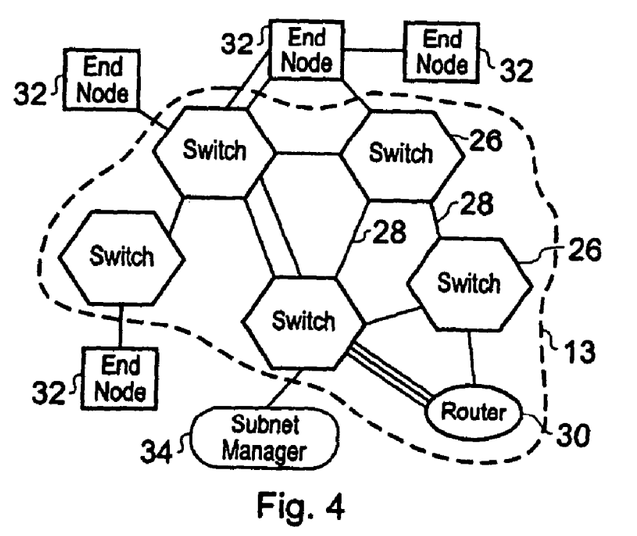
FIG. 4 is a schematic block diagram of a further simplified arrangement of an InfiniBand Architecture system.

Examples of possible InfiniBand Architecture topologies are shown in FIGS. 2, 3 and 4. FIG. 2 shows a high level simplified topology example where a number of end nodes 32 are interconnected by the fabric 12. An InfiniBand Architecture network may be subdivided into subnets 13 interconnected by routers 30 as illustrated in FIG. 3. Any particular end node 32 may be attached to a single subnet 13 or to multiple subnets 13. Shown in FIG. 4 is an example of the structure of a subnet 13. The subnet 13 comprises end nodes 32, switches 26, routers 30 and subnet managers 34 interconnected by links 28. Each end node 32 may attach to a single switch 26, multiple switches 26 and/or directly with each other. In the case of a direct connection between end nodes 32, the two or more directly linked end nodes form in effect an independent subnet with no connectivity to the remainder of the devices attached to the main subnet, and one of the interconnected end nodes functions as the subnet manager for that link.

Figure 5:
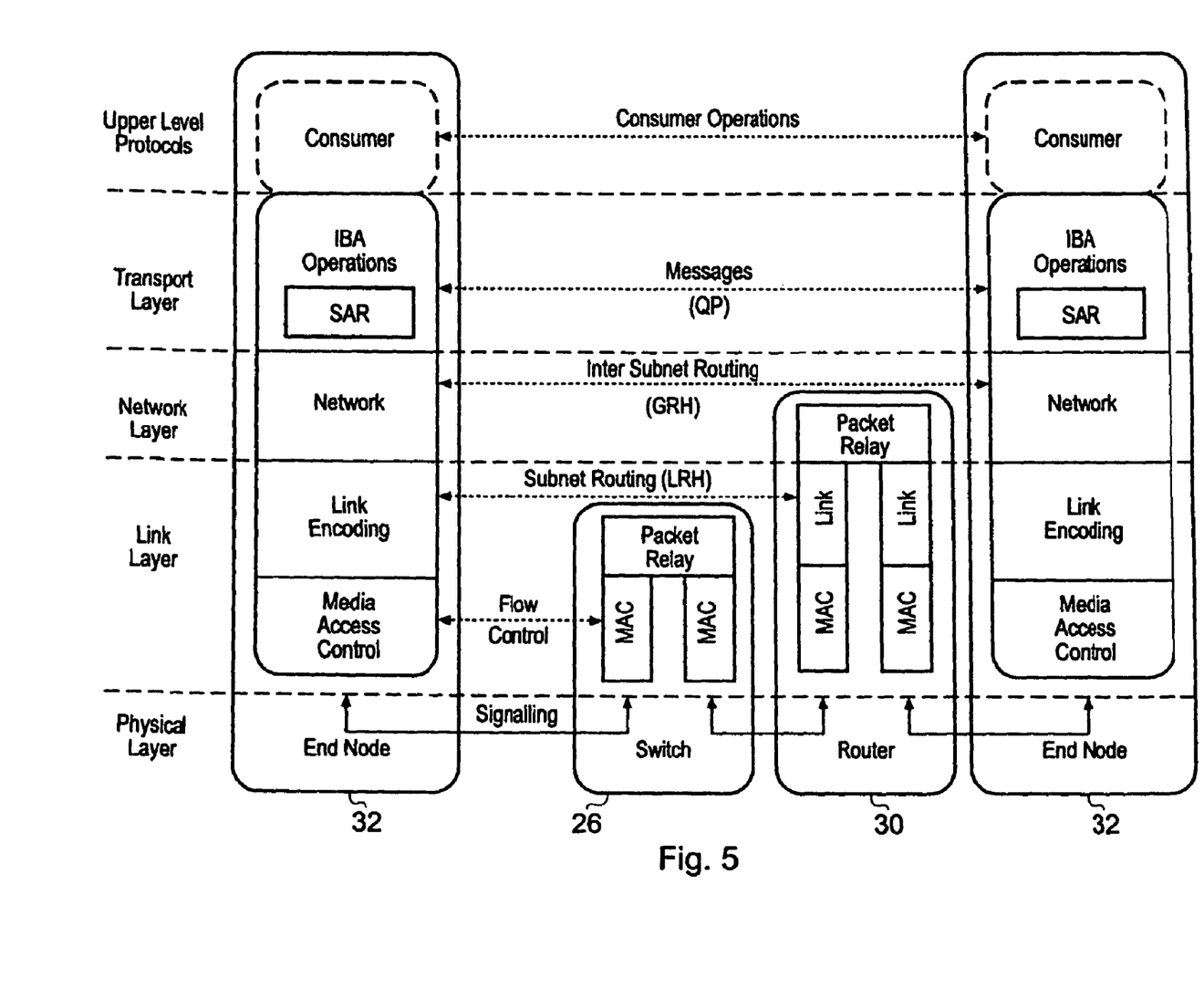

Referring now to FIG. 5, there is shown an illustration of the architecture layers of an InfiniBand Architecture system. Starting with the physical layer, this specifies how bits are placed onto the interconnections 28 and defines the symbols used for framing (i.e. start of packet and end of packet), data, and fill between packets (idles). It also specifies the signalling protocol as to what constitutes a validly formed packet (i.e. symbol encoding, proper alignment of framing symbols, no invalid or non-data symbols between start and end delimiters, no disparity errors, synchronisation method, etc.). The signalling protocol used by the InfiniBand Architecture utilises a differential signal. The interconnects 28 between nodes of an InfiniBand Architecture network are normally provided by electrical signal carriers such as copper cables or optical signal carriers such as optical fibres. As discussed above, the maximum data rate of the interconnect is limited by the bandwidth of the selected channel. The physical layer also includes de-skewing circuitry for compensating for skew latency in the channels.

Figure 6:
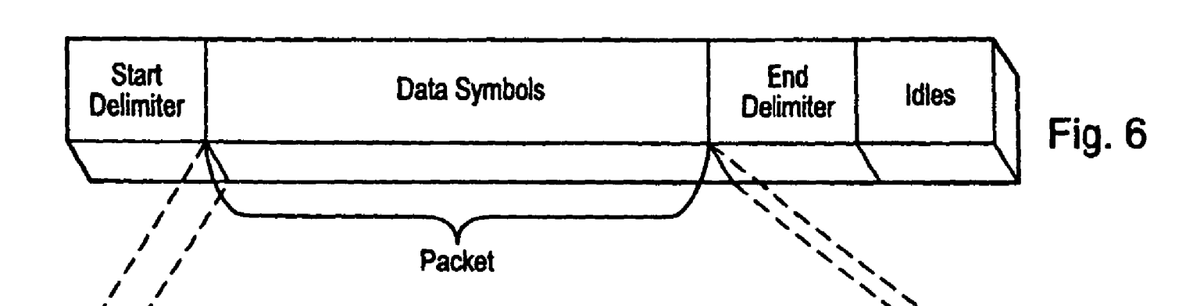
FIG. 6 shows schematically the structure of a message to be transmitted via an InfiniBand Architecture system.

The structure of a message to be transmitted through the fabric 12 via the interconnections 28 is illustrated in FIG. 6. As can be seen from FIG. 6, the message comprises a start delimiter, a packet comprising data symbols, an end delimiter and a number of idles.

Figure 7:
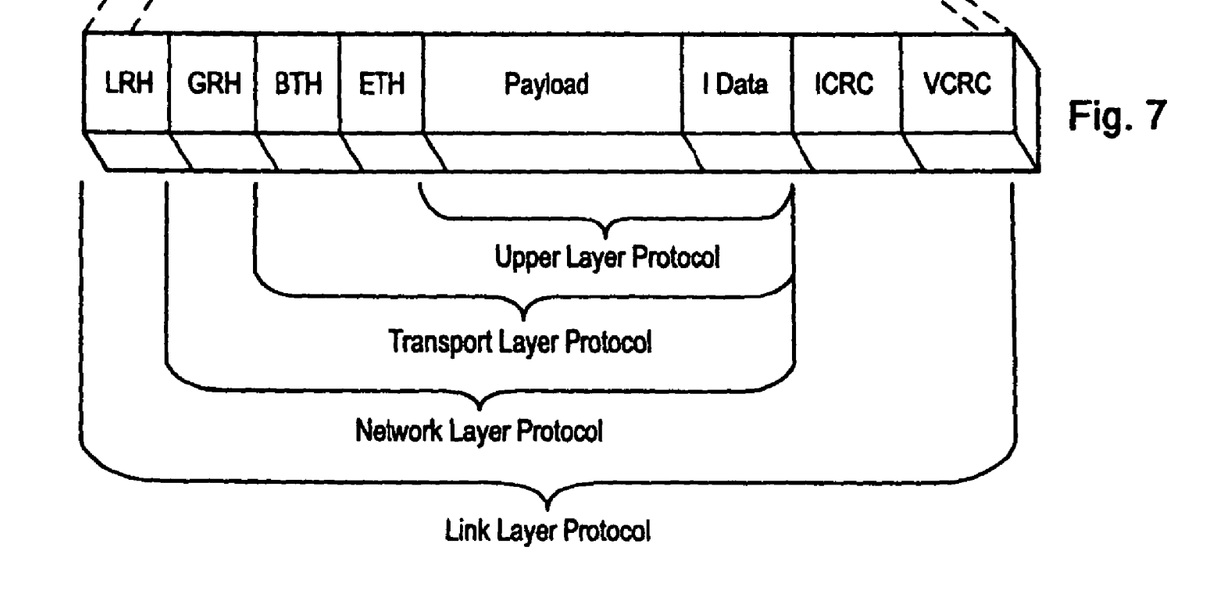
FIG. 7 shows schematically the format of a packet of the message of FIG. 6.

The data packet format is illustrated in FIG. 7. Packets may be one of two types, IBA (InfiniBand Architecture) Packets or RAW (non InfiniBand Architecture) Packets. IBA Packets have IBA defined transport headers, are routed on InfiniBand Architecture fabrics 12, and use native InfiniBand Architecture transport facilities. Raw Packets may be routed on IBA fabrics but do not contain InfiniBand Architecture transport headers. From an InfiniBand point of view, these packets contain only InfiniBand routing headers, payload and CRC. The InfiniBand Architecture does not define the processing of these packets above the link and network layers. These packets can be used to support non-InfiniBand Architecture transports (e.g. TCP/IP, IPX/SPX, NetBUI etc) over an InfiniBand fabric.

The link layer describes the packet format and protocols for packet operation, e.g. flow control and how packets are routed within a subnet between the source and the destination. Packets may be data packets that convey data between end nodes and comprise a number of different headers which may or may not be present. Alternatively, packets may be Link Management Packets, which are used to train and maintain link operation. These packets are used to negotiate operational parameters between the ports at each end of a link such as bit rate, link width etc. The link layer is responsible for flow control handling to prevent the loss of packets due to buffer overflow by the receiver at each end of a link. This mechanism does not describe end to end flow control such as might be utilised to prevent transmission of messages during periods when receive buffers are not posted. The terms "transmitter" and "receiver" are utilised to describe each end of a given link. The transmitter is the node sourcing data packets. The receiver is the consumer of the data packets. Each end of the link has a transmitter and a receiver. The InfiniBand Architecture utilises an "absolute" credit based flow control scheme, in which InfiniBand Architecture receivers provide a "credit limit". A credit limit is an indication of the total amount of data that a transmitter has been authorised to send since link initialisation.

Credit control is performed by a media access control (MAC) protocol. With respect to a given link, a receiver advertises (by means of a link packet) that credit is available, the amount of which is based on the current status of the receiver's receive buffers. The transmitter receives the link packet and determines how much transmit credit is available from the contents of the link packet. The transmitter then assigns itself the available credit and transmits data packets to the receiver while simultaneously decrementing its available credit count. The transmitter calculates its remaining available credit based on the initial figure determined from the receiver link packet and a record of how much data it has transmitted since that link packet was received.

Errors in transmission, in data packets, or in the exchange of flow control information can result in inconsistencies in the flow control state perceived by the transmitter and receiver. The InfiniBand Architecture flow control mechanism provides for recovery from this condition. The transmitter periodically sends an indication of the total amount of data that it has sent since link initialisation. The receiver uses this data to re-synchronise the state between the receiver and transmitter.

As can be seen in FIG. 7, the link layer adds a Local Route Header (LRH) to the front of the packet and adds Invariant and Variant Cyclic Redundancy Checks (ICRC and VCRC) to the end of the packet. The Local Route Header is always present and identifies the local source and local destination where switches 26 will route the packet. The Invariant Cyclic Redundancy Check covers all fields within the packet which do not change as the message traverses the fabric. The Variant Cyclic Redundancy Check covers all the fields of the packet. The combination of the two CRCs allows switches 26 and routers 30 to modify appropriate fields and still maintain data integrity for the transport control and data portion of the packet.

The network layer, which is present only within routers 30 and end nodes 32, describes the protocol for routing a packet between subnets 13. Thus a Global Route Header (GRH) is present in a packet that traverses multiple subnets 13. The Global Route Header identifies the source and destination ports of the message. Routers 30 use the contents of the Global Route Header to determine the forwarding requirements of the message. As the message traverses different subnets 13 the routers 30 modify the content of the Global Route Header and replace the Local Route Header but the source and destination port identities are not changed and are protected by the Invariant Cyclic Redundancy Check. Thus the network and link layers operate together to deliver a packet to the desired destination.

The transport layer, which is present only within end nodes 32, delivers the packet to the proper Queue Pair within the channel adapter of the destination end node 32 and instructs that Queue Pair as to how the packet's data should be processed. The transport layer also has responsibility for segmenting a message into multiple packets when the message's data payload is greater than the maximum payload that can be carried by a single packet. The receiving Queue Pair then reassembles the data from the multiple packets at the destination end node 32. The transport layer adds up to two headers to the packet. The Base Transport Header (BTH) is present in all IBA Packets but not in RAW Packets. It identifies the destination Queue Pair and indicates an operation code, packet sequence number and specifies the operation (Send, Read, Write etc). A number of Extended Transport Headers (ETH) may be present conditional on the class of service and operation code.

The Packet Sequence Number is initialised for a given Queue Pair as part of the communications establishment process and increments each time that Queue Pair creates a new packet. The receiving Queue Pair tracks the received Packet Sequence Number to determine whether any packets have been lost. For reliable service, the receiver end node 32 may transmit an acknowledgement back to the originator end node to indicate whether all packets have been received successfully.

The upper level protocols are completely software based and may comprise any number of protocols used by various user consumers. The payload is the data carried by the packet and I Data is handling data associated with a work activity to be performed on the payload. Also present in the upper level protocols are Subnet Management and Subnet Services protocols. These protocols provide management structure including management messages for management of the subnet 13. Each subnet 13 requires only a single Subnet Manager application 34 which may be present in a dedicated node (as illustrated in FIG. 4) or may reside in another node, including a switch 26 or a router 30 as well as an end node 32.

Figure 8:
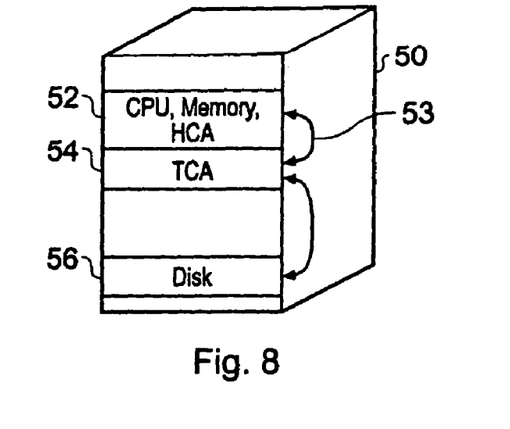
FIG. 8 is a schematic block diagram showing an arrangement where the InfiniBand Architecture is used to interconnect components within a computer system.
Figure 9:
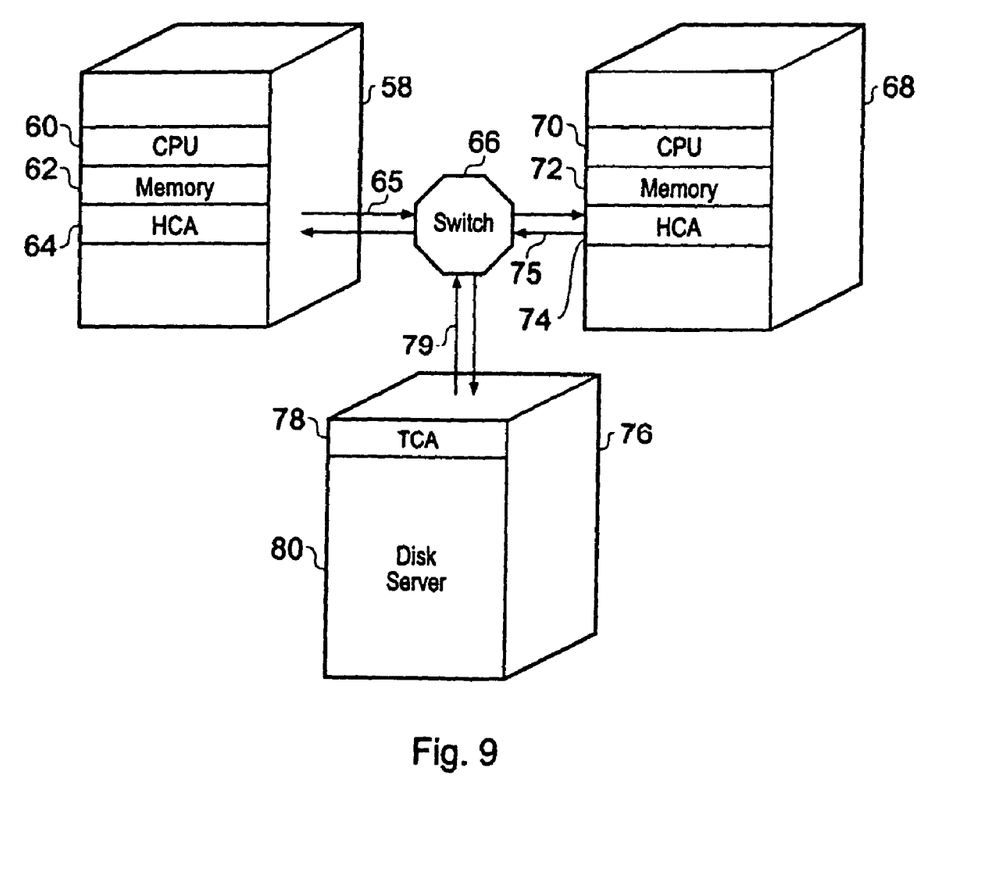
FIG. 9 is a schematic block diagram showing an arrangement where the InfiniBand Architecture is used as an interconnect between computer systems.

Examples of simple InfiniBand Architecture systems are shown in FIGS. 8 and 9. FIG. 8 shows an arrangement where the InfiniBand Architecture is used to interconnect components within a standard computer system rack 50. In this example, the CPU, memory and a Host Channel Adapter 52 are interconnected using conventional non-InfiniBand Architecture techniques. The Host Channel Adapter 52 of the CPU and memory communicate via an InfiniBand Architecture interconnect 53 with a Target Channel Adapter 54. The Target Channel Adapter 54 communicates with a disk drive unit 56 via a SCSI (Small Computer System Interface) connection. Thus the InfiniBand Architecture is configured in this example to facilitate communications between elements of the same computer system.

FIG. 9 shows an arrangement where the InfiniBand Architecture is used only as an interconnect between computers. In this example a first computer system is mounted in a rack 58 and comprises a CPU 60, memory 62 and a Host Channel Adapter 64 interconnected via non-InfiniBand Architecture techniques. Via the Host Channel adapter 64, the first computer system communicates to and from a switch 66 across interconnects 65. Also connected to the switch 66 is a second computer system mounted in a rack 68 and comprising a CPU 70, memory 72 and a Host Channel Adapter 74, which connects to the switch 66 via interconnects 75. Data storage for the first and second computer systems is provided by a disk server 80 mounted in a rack 76. The disk server 80 connects with a Target Channel Adapter 78 also mounted within the rack 76 by non-InfiniBand Architecture techniques. The Target Channel Adapter 78 connects to the switch 66 via interconnects 79. Thus the InfiniBand Architecture is configured in this example to facilitate communication between more than one distinct computer system. The techniques shown in FIGS. 8 and 9 may be employed in combination with one another, for example a computer system using the InfiniBand Architecture for internal communications may also be connected to other computer systems via a network based on the InfiniBand Architecture.

Figure 10:
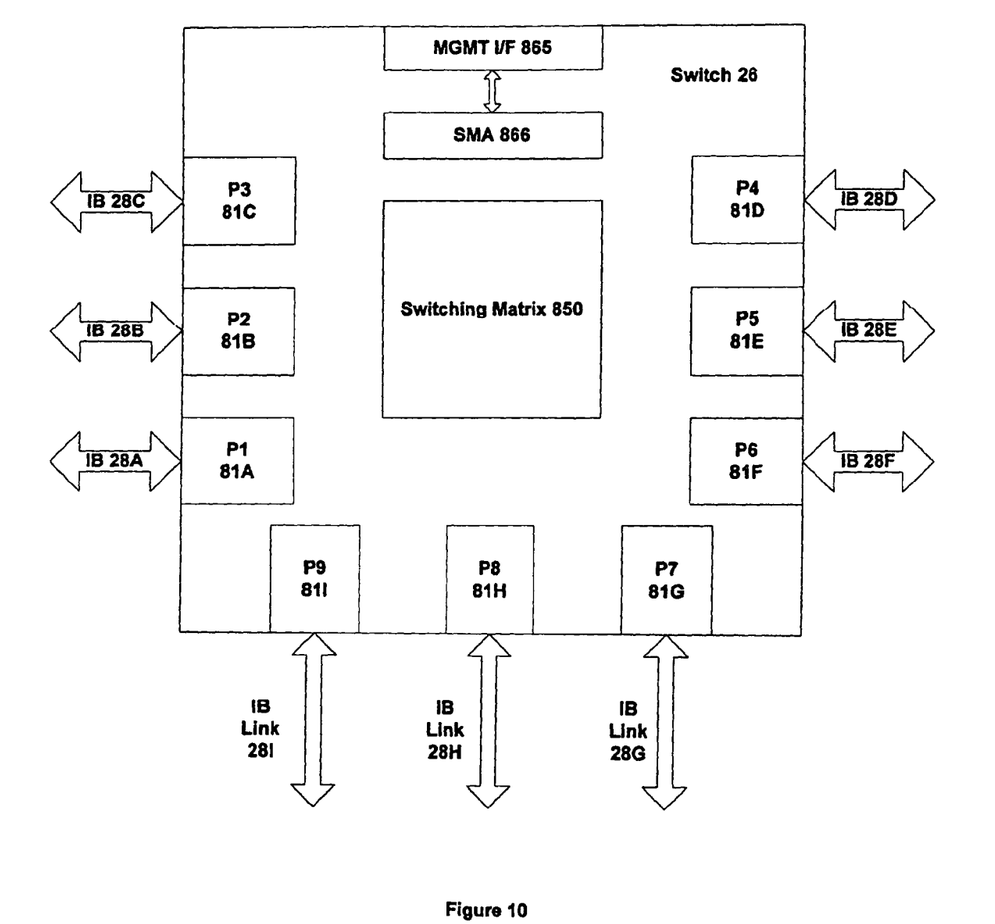
FIG. 10 is a schematic block diagram showing a switch for use in an InfiniBand network in accordance with one embodiment of the invention.

FIG. 10 illustrates a switch 26 for use in fabric 12 in accordance with one embodiment of the invention. Switch 26 is implemented as a semiconductor device, for example an application specific integrated circuit (ASIC), and includes a management control interface 865, a subnet management agent (SMA) 866, multiple ports 81, and a switching matrix 850.

The management interface 865 provides access to the switch 26 for one or more external control systems, and can be used to configure switch 26 as appropriate depending upon the circumstances. For example, the subnet management agent 866 can communicate with the subnet manager 34 (see FIG. 4) via management interface 865.

In the embodiment illustrated in FIG. 10, switch 26 has nine ports 81, 5 denoted in FIG. 10 as P1 81A, P2 81B, P3 81C, P4 81D, P5 81E, P6 81F, P7 81G, P8 81H, and P9 81I. Each port is attached to a corresponding InfiniBand duplex link 28 providing transmit (Tx) and receive (Rx) capability, and comprising one, four or twelve physical lanes. Each physical lane provides a basic data rate of 2.5 GHz, so that switch 26 provides connectivity for a total of 96 (9×12) lanes. The physical lanes into any given port are managed as a single logical link, and can be flow controlled using a credit-based link level flow control, as described above.

In accordance with the InfiniBand Architecture, each link 28 can be subdivided into a maximum of sixteen virtual lanes (VL) to provide logically separate channels that are multiplexed onto a single logical link. The first fifteen virtual lanes (denoted VL0 through VL14) support general purpose data communications, while the remaining virtual lane (denoted VL15) is used for special management purposes. (Note that virtual lane VL15 is not flow-controlled, and so should be considered as not reliable). An InfiniBand switch must support at least two virtual lanes on each link (i.e. data lane VL0 and management lane VL15). In one particular embodiment, switch 26 supports four virtual lanes for general data communication plus one virtual lane for management purposes (VL15).

In accordance with the InfiniBand Architecture, a packet can be specified as having one of sixteen different service levels (SLs). The service level for a particular packet is specified in the local route header (LRH), and remains constant as the packet transits an InfiniBand subnet. The SL value in the packet determines the virtual lane over which the packet is transmitted across any given link in the subnet. This is achieved by having a switch maintain a set of SL-to-VL mappings (which are specific to each input port/output port combination). The SL-to-VL mappings are initialized and maintained by the subnet manager 34 (see FIG. 4).

On receipt of an incoming packet, a port first determines the output port to forward the packet to, based on the DLID value in the packet (as explained in more detail below). The port then uses the SL-to-VL mappings to decide the virtual lane over which the packet should be sent, given the SL value in the packet and the output port from which the packet will be transmitted. Note that since different switches may support different numbers of virtual lanes, a packet may be assigned to different virtual lanes for different links of its journey across a subnet.

The range of service levels can be used to provide a quality of service (QoS) mechanism in an InfiniBand network. Thus any given virtual lane can be classified as low priority or high priority, and assigned a weight within that classification. The weight and classification of a virtual lane control its access to the bandwidth of the physical link, relative to the other virtual lanes supported over the same link. The service level of a packet then determines the virtual lane utilised by the packet over the link, in accordance with the SL-to-VL mappings. These mappings can be configured to reflect the number of virtual lanes provided by any given link and also the quality of service policy of the network.

The InfiniBand Architecture supports the concept of partitioning in order to provide logical isolation of components sharing the same subnet. All nodes included in a route from a source to a destination must share the same 16-bit partition key (P_Key), otherwise they are unable to communicate with one another (or even to recognise each other's existence). An individual node may support multiple partition keys, and so belong to multiple different partitions.

A member of a partition can be denoted as a full member or a limited (partial) member, dependent on the high-order bit of the partition key. A full member can communicate with either a limited member or a full member, but a limited member cannot communicate with another limited member of that partition (only a full member). This model corresponds to a client-server architecture, where servers are full members and clients are partial members, and clients do not need generally to talk directly to one another.

Each queue pair at an end node has a partition key table which is assigned to it by the subnet manager 34 (see FIG. 4). A queue pair is assigned an index into the partition key table, and can then use this index to obtain and store the appropriate partition key into the local route header (LRH) for each outgoing packet. Conversely, a queue pair receiving a packet checks that the P_Key value within the incoming packet matches the indexed P_Key value in the P_Key table (if not, the incoming packet is discarded).

Each port 81 on switch 26 is provided with an input buffer (not shown in FIG. 10). The input buffer receives data arriving at a port 81 over its respective link 28, and stores this data pending transfer through the switching matrix 850. In the embodiment mentioned above, each input buffer is divided into four sections, corresponding to the four virtual lanes on the associated link 28. This ensures that data from different virtual lanes is kept properly isolated.

Switching matrix 850 is used to transport data from one port to another. For example, if data arrives on link 28D at port P4 81D and is to be forwarded on link 28A, then switching matrix 850 is responsible for transferring the data from port P4 81D to port P1 81A (corresponding to link 28A). It will be appreciated that while ports 81 are constrained by the InfiniBand standard (in order to ensure network connectivity), to some extent switching matrix 850 can be regarded as a more generic switching device, since it is internal to switch 26 and therefore shielded (at least in part) from other network devices.

The InfiniBand architecture supports two general modes of communication. The first of these is unicast or point-to-point, in which each data packet goes from a single source to a single destination. This translates into switching matrix 850 transferring a packet from one incoming port to one outgoing port. The other mode of communication in InfiniBand is multicast, in which a packet may be routed from a single source to multiple destinations. This is mirrored in the passage of the packet through switching matrix 850, whereby a packet from an incoming port may be directed to multiple outgoing ports.

It is desirable for the switch 26 to have low latency and high efficiency. A low latency implies relatively small amounts of buffering, otherwise delays through the switch will tend to increase. A high efficiency implies that the performance of the switch 26 is not degraded due to competition for resources within the chip as the load (i.e. the traffic through the switch) rises.

As part of the start-up procedure of an InfiniBand network, the subnet manager 34 (see FIG. 4) assigns each end-node port in a subnet a local identifier (LID). Note that the individual ports 81 in switch 26 are not assigned their own LIDs, although an LID is assigned to port 0 of switch 26, which can be regarded as corresponding to management interface 865. (The switch management port, i.e. port 0, is considered an end-node in the InfiniBand network, unlike the other switch ports).

Each LID comprises two portions, a base LID and a number of path bits. The number of path bits in the LID for a given port is determined by the LID mask count (LMC), which is also assigned by the subnet manager 34. Each packet in transit on the subnet contains the LID of the port from which it originated, namely the source LID (SLID), and also the LID for the port to which the packet is going, namely the destination LID (DLID). The SLID and the DLID are incorporated into the local route header (LRH) of the packet.

When a packet is received at its destination, the port checks that the DLID in the packet matches the LID for that port. Note that in this comparison the path bits of the LID are masked out, so that in effect the comparison is made against the base LID for the port. Thus for the purpose of destination checking, the path bits are ignored. However, in terms of routing a packet through a switch, the path bits are taken into consideration. This then allows multiple paths to be specified that all arrive at the same destination port. The ability to provide multiple paths through a subnet to the same destination port aids robustness and reliability within the network.

2) Packet Routing through the Switch

Packets arriving at each port of switch 26 must be correctly routed through the switching matrix 850. This is achieved through the use of a routing table (not shown in FIG. 10), which contains information about which port 81 of the switch 26 represents the correct route to the ultimate destination of the packet. The routing table includes a list of possible destinations for a packet, each being associated with a port 81 of the switch 26. Packet destinations may include TCAs and management ports within InfiniBand switches.

Figure 11:
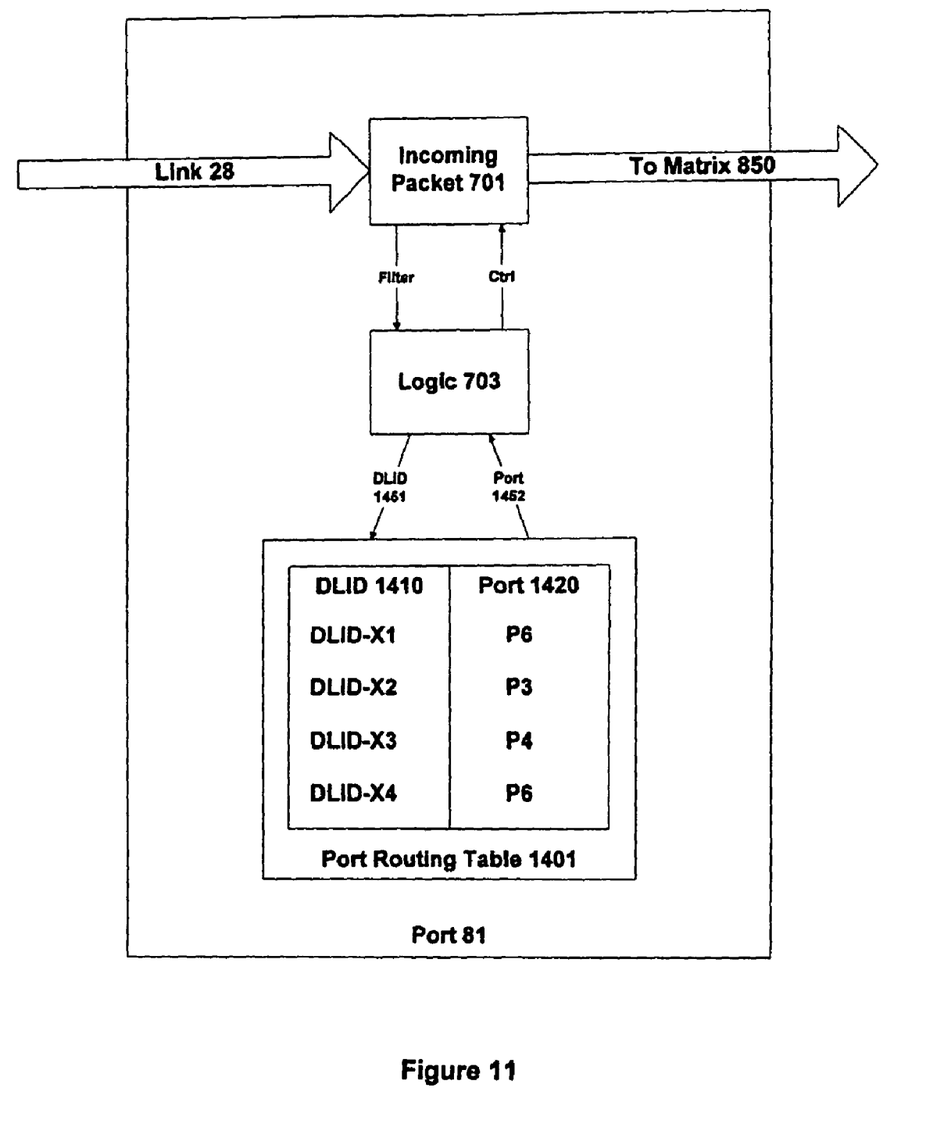
FIG. 11 is a schematic block diagram of a port for use in an InfiniBand network in accordance with one embodiment of the invention.

FIG. 11 illustrates an embodiment of the present invention in which each port 81 on switch 26 includes its own routing table 1401 in memory (e.g. RAM). This routing table 1401 may be made specific to the particular port 81 in which it is contained. The routing table 1401 can be regarded as having two columns, namely a first column 1410 representing DLID, and a second column 1420 representing port. Routing table 1401 can be indexed by DLID in order to obtain a port number.

In operation, port 81 receives an incoming packet 701 over link 28. The incoming packet 701 may be stored into a buffer or other component as appropriate. The DLID field of the incoming packet is then extracted from the packet header by an appropriate masking or filtering of the packet 701 and passed to logic 703. Note that in some embodiments, in order to maximise speed of processing, the DLID field for a packet may be extracted (and subsequently processed) before the complete packet itself has arrived at the port 81. This then avoids having to wait for the whole packet to arrive before a decision can be made as to where the packet should be routed.

Logic component 703 uses the DLID value 1451 extracted from the incoming packet 701 in order to index into (or otherwise access) port routing table 1401. In particular, logic 703 receives back from port routing table 1401 the port number 1452 that corresponds to the DLID value 1451 extracted from the incoming packet 701. For example, in the particular configuration shown in FIG. 11, if the incoming DLID value 1451 equals DLID-X2, then the incoming packet 701 is to be forwarded to Port 3 in the switch. Once logic 703 has determined the port 1452 to which incoming packet 701 should be directed, it performs appropriate control operations to route the packet through the switching matrix 850 to the specified port for onward transmission of the packet from the switch.

In one embodiment, port 81 forwards the packet to the output buffers of all the other ports on the switch. Port 81 also transmits an output buffer select message to the specified destination port, thereby allowing the packet to be stored into the output buffer of this particular port (for forwarding over the network). None of the other ports receives the output buffer select message, and accordingly they discard the forwarded packet.

Entries in the routing table 1401 are inserted via the management interface 865 of the switch 26 using information supplied by the subnet manager 34. The table can be updated via the management interface 865 in response to information describing the addition of new destinations, the removal of old destinations, and alterations to the network resulting in revised routings.

The use of per port-routing tables 1401 within switch 26 helps to reduce latency within the switch. Firstly, the routing table 1401 can be located adjacent the control logic for the port, thereby allowing very quick access. In addition, there is no possibility of contention delays caused by different ports all trying to access a shared routing table at the same time. In addition, if a routing table becomes unavailable at any time (e.g. because the routing information is being updated), then this does not impact all communications through the switch, but rather only communications through the one port that contains the particular routing table that is being updated. (Note that in some embodiments contention controls can be provided at the hardware level to allow a routing table to be updated without interruption in the use of the table for packet forwarding purposes).

In some embodiments, the routing tables 1401 within each port are copies of one another (i.e. all the routing tables are the same). In other embodiments however, the routing tables are customised to their associated port. For example, if a port is not included within a route to a given destination node, then the corresponding DLID can be omitted from the routing table for that port. One advantage of this is that it may allow the routing tables 1401 to be reduced in size, since they only need to accommodate a subset of routes through the switch (i.e. the subset of routes relevant to the particular port with which they are associated). In addition, it permits a much greater discrimination of packets within the network, including the ability to detect and remove certain aberrant packets (whether introduced into the network accidentally, for example due to some malfunction, or deliberately to disrupt proper operation of the network). Furthermore, it allows different path selections to be enforced on a per-port basis to the same end destination.

Figure 12:
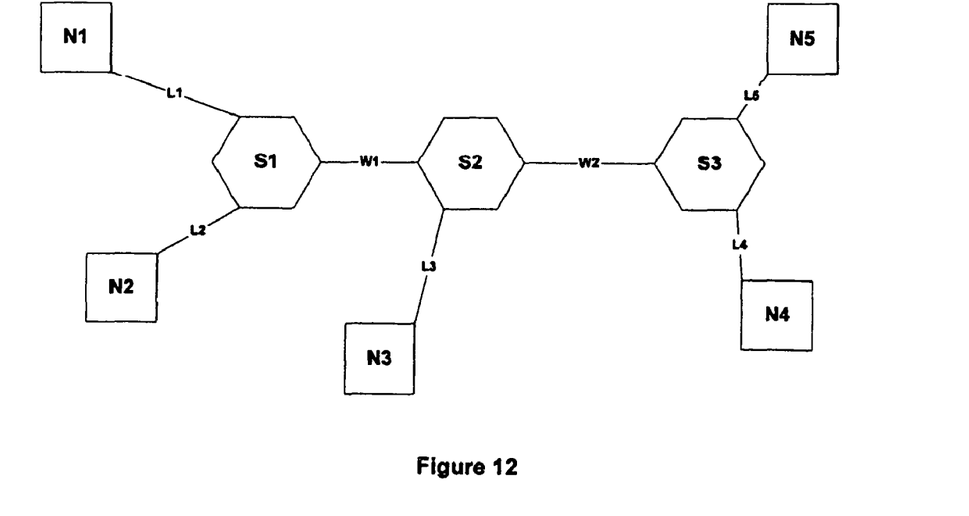
FIG. 12 is a schematic diagram showing a possible configuration of nodes and switches in an InfiniBand network.

FIG. 12 depicts a sample network configuration of a subnet, which includes three switches 26, shown as S1, S2 and S3. Attached to switch SI are nodes N1 and N2; attached to switch S2 is node N3; and attached to switch S3 are nodes N4 and N5. (It will be appreciated that the subnet shown in FIG. 12 represents a rather simple network configuration, and that in practice, the number of nodes and/or switches may be significantly greater than in the diagram).

The various nodes and switches in FIG. 12 are connected by the links shown, namely link L1 between node N1 and switch S1, link L2 between node N2 and switch SI, link L3 between node N3 and switch S2, link L4 between node N4 and switch S3, and link L5 between node N5 and switch S3. In addition switch S1 is joined to switch S2 by link W1, and switch S2 is joined to switch S3 by link W2.

One possible form of attack on the network of FIG. 12 is a denial of service attack, for example, where node N4 sends a large number of packets to node N1, which are routed via switches S1 and S2 to try to prevent or degrade the operation of node N1. One mechanism provided by existing InfiniBand networks to try to prevent such attacks is the use of partitions, but this mechanism is not available if nodes N1 and N4 (and intermediate switch ports) belong to the same partition. Moreover, even if nodes N1 and N4 are in different partitions, it is possible for packets to traverse the network from N4 to N1 (assuming that the proper LID routing is in place). This is because a P_Key violation caused by the partition mismatch may only be detected at the receiving node (depending on partition support within any intervening switches), and hence the packets may not be discarded until arriving at node N1. However, by this stage the packets will already have consumed network bandwidth, and may also generate noise in the form of excessive traps.

The use of a per port routing table 1401 helps to avoid the above problems. For example, it may be that the network includes a route from node N5 to node N1, but not from node N4 to node N1. In this situation, the routing table for the port of switch S3 attached to link L5 (and hence to node N5) contains a routing for the DLID corresponding to node N1. In contrast, the routing table for the port of switch S3 attached to link L4 (and hence to node N4) does not contain such a routing for the DLID corresponding to node N1. Packets received at switch S3 from node N4 directed to node N1 are therefore discarded at switch S3, given that there is no onward routing for their DLID. Accordingly, the rest of the network is protected from such (illicit) packets.

Figure 13:
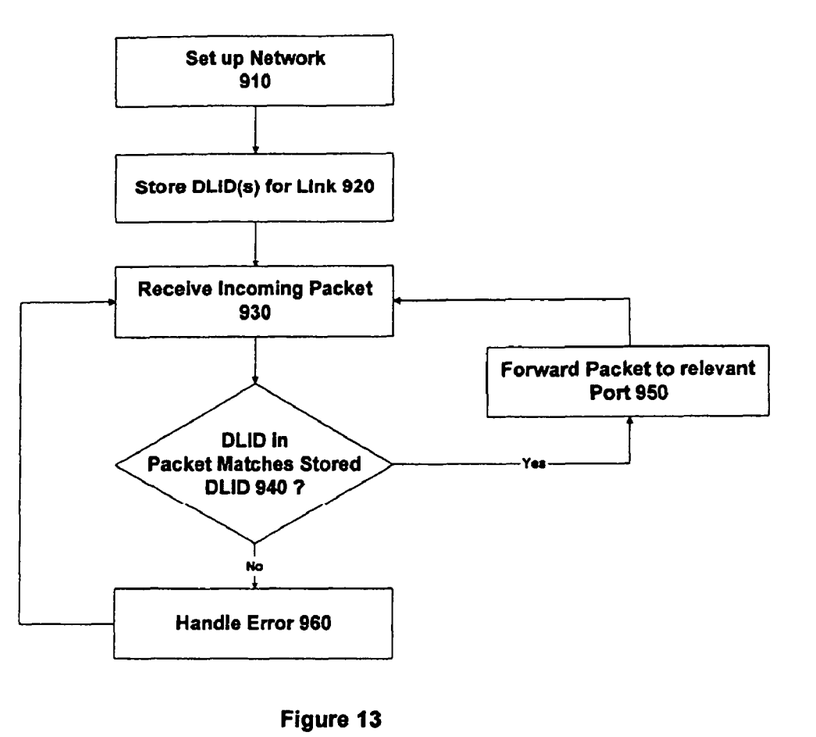
FIG. 13 is a flowchart for processing destination identifiers in accordance with one embodiment of the network.

FIG. 13 is a flowchart illustrating discarding packet as described above. The method commences with setting up the network (910). As previously discussed, this includes the subnet manager assigning LIDs to the various ports, and creating routes through the network. As part of this set-up, a port receives and stores into routing table 1401 information about the appropriate DLIDs for incoming packets (920) to that port, in other words DLIDs corresponding to routes through that particular port.

The port now receives an incoming packet (930), and the DLID value is extracted. Next, the routing table 1401 is accessed to determine whether or not a forwarding entry is present for this DLID value (940). If so, the packet is forwarded to the relevant port identified in the routing table for this particular DLID value for onward transmission through the network (950). If not, the packet is discarded and any appropriate error handling is performed (e.g. sending a notification to the subnet manager) (960).

The are various possible implementations of routing table 1401. One possibility is to store DLIDs for supported routes, each with a corresponding port number 1401. (This corresponds to the general structure shown in FIG. 11). If a particular DLID is not present in the routing table 1401, then it is assumed that the DLID value is not valid for that port.

In another embodiment, the DLID values themselves are not stored in routing table 1401, but rather are used to index into an appropriate port number (i.e. in this embodiment the DLID column 1410 per se can be omitted from routing table 1401, its presence being implicit rather than explicit). In this case, some other mechanism (rather than just absence or presence of an entry in routing table 1401) is used to indicate whether or not a given DLID value is valid for the port. One possibility is to use one or more dedicated control bits to indicate the validity status of DLID. Another possibility is to use some predetermined (special) port number to indicate an invalid DLID, e.g. port −1 (assuming no real port on the switch has this designation).

One particular option is based on the fact that a single port cannot represent both the ingress and the egress for a given packet. Therefore, a port could store its own port number into routing table 1401 to indicate an invalid DLID. In other words, if the port number 1452 returned for a given DLID 1451 (see FIG. 11) represents the port into which the packet has been received (i.e. the port containing the routing table in which the lookup is being made), then it is known that the DLID is not valid for that port, and accordingly an error is raised (corresponding to operation 960 in FIG. 13).

One advantage of using a port's own number in this manner to depict an invalid DLID for the port is that it can allow a compact representation of the routing table 1401. In particular, it may be possible to represent an invalid DLID using the same set of bits that are allocated already to indicate the output port in routing table 1401.( This is in contrast to the addition of an extra control bit, which may represent a significant percentage increase on the size of a routing table, e.g. 25%).

The use of per port routing tables permits the provision and enforcement of different routes for the same destination as a function of source node (or more particularly, the ingress port into the switch). This avoids end nodes having to set up and adhere to complicated multiple routings based on LMC bits in the destination identifier.

Although the embodiments described so far have had a routing table 1401 in each port, in other embodiments a central shared location within the switch may be used to store a set of port-specific routings (rather than distributing them around the various ports). In this case, a port accesses the routings that are specific to itself in making a forwarding decision (e.g. the routings might be indexed by port number). This shared approach may be especially attractive if the majority of DLID mappings are common to all ports (and so only need to be stored once in the switch 26), with only a subset of DLID mappings being port-specific.

Figure 14:
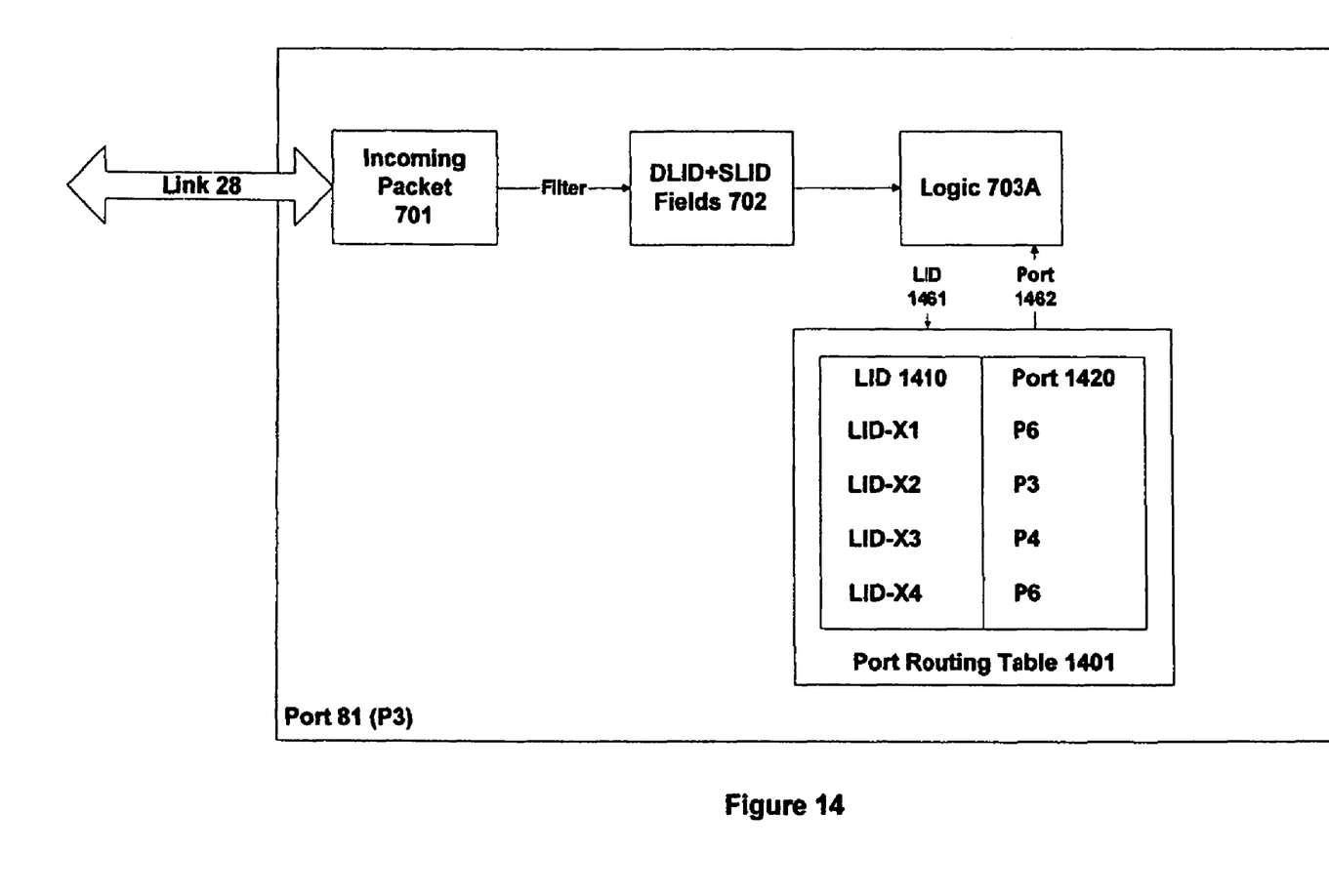
FIG. 14 is a schematic block diagram of a port for use in an InfiniBand network in accordance with another embodiment of the invention.

FIG. 14 illustrates another embodiment of the invention, in which routing table 1401 is not only used for determining how to forward a packet, but also for verifying the SLID of an incoming packet. In this embodiment, an incoming packet 701 is received and the SLID and DLID fields 702 are extracted by any suitable mechanism (e.g. masking, filtering, and so on). Logic 703A within port 81 now uses the extracted SLID and DLID fields to access port routing table 1401.

Conceptually, for any given port 81, LID space can be divided into two portions. The first corresponds to LIDs for nodes on the external (link) side of the port. The second corresponds to LIDs for nodes on the internal (switch) side of the port. It will be appreciated that an external LID represents a valid SLID, but not a valid DLID, while an internal LID represents a valid DLID, but not a valid SLID (for that particular port).

Accordingly, the LID values 1410 in port routing table 1401 cover both the internal and external ranges of LID values. Each LID value 1410 has a corresponding port value 1420. Associated with the external LID values are the port numbers for onward transmission, as in the routing table of FIG. 11. Associated with the internal LID values (i.e. with LIDs corresponding to an acceptable SLID) is the port number for the port itself, in other words the port that owns routing table 1401.

Routing table 1401 can therefore be used for two different tasks in port 81. The first represent a determination of the port to which a particular incoming packet 701 should be forwarded. In this case, a look-up is performed based on the value of DLID in the incoming packet. In addition, routing table 1401 will also be consulted when the SLID is to be verified, in which case the look-up is performed based on the value of SLID in the incoming packet.

When the DLID lookup is performed for routing purposes, then an acceptable result is the port number for any port other than the port that owns table 1401. Conversely, for SLID authentication, the only acceptable result is the port number corresponding to the port that owns table 1401. This then reflects the split of LID space between external values (for SLID verification) and internal values (for DLID routing). If a DLID lookup does return the port number corresponding to the port that owns table 1401, this represents an error, i.e. a failed routing, and the packet is discarded (corresponding to operation 960 in FIG. 13). Likewise, if an SLID lookup does not return the port number corresponding to the port that owns table 1401, this also represents an error, and so implies failure of the SLID authentication. Again, such failure will cause the packet to be discarded, and may also cause an error notification to be raised.

In the particular example shown in FIG. 14, it is assumed that port 81 corresponds to port P3. In this case, only the LID range identified as LID-X2 in table 1401 would represent a valid SLID, while LID ranges LID-X1, LID-X3, and LID-X4 would all represent invalid SLIDs. Conversely, LID-X2 would represent an invalid DLID, but any of the other LID ranges in table 1401 would represent valid DLIDs.

Note that there may be some LID values that do not correspond either to a valid DLID or to a valid SLID. For example, some LID values may not be assigned within the network 12 (or may not have routes associated with them). In addition, as previously mentioned, switch 26 may have its own LID range corresponding to port 0 (the management interface). These LID ranges can then be assigned special port numbers in the routing table 1401, e.g. port −1 for an unassigned LID value, and port 0 for the LID range of the management interface. In general these special port values do not represent a valid SLID or a valid DLID, and have to be specially handled.

Although the embodiment of FIG. 14 utilises a combined DLID/SLID lookup table 1401, in another embodiment separate lookup tables could be provided for DLID and SLID. The SLID lookup table would then operate as described above, namely for any given input LID value it would return a result indicative of whether or not that LID represented a valid SLID.

One embodiment of the invention described herein is provided as a computer program product, which may comprise program instructions stored on a removable storage medium, for example an optical (CD ROM, DVD, etc), semiconductor (e.g. flash memory) or magnetic (floppy disk, tape, etc) device. Such a medium can then be introduced into a computer system, such as a server, a client, a smart card, a network device (e.g. a switch) etc., in order to transfer the program instructions to the system. Alternatively, the program instructions may be transferred to the computer system by download via a transmission signal medium over a network, for example, a local area network (LAN), the Internet, and so on. The transferred program instructions are often stored on a hard disk or other non-volatile storage of a computer system, and loaded for use into random access memory (RAM) for execution by a system processor.

In conclusion, a variety of particular embodiments have been described in detail herein, but it will be appreciated that this is by way of exemplification only. The skilled person will be aware of many further potential modifications and adaptations that fall within the scope of the claims and their equivalents.

The invention claimed is:

1. A method of operating a switch in a communications network, the method comprising:
storing a set of routings in each port in the switch, wherein the set of routings stored in each port is specific to the port in which the set of routings is contained;
receiving a packet at a port in the switch;
accessing the set of routings corresponding to the port at which the packet was received and determining a port from which to forward the packet from the switch in accordance with said set of routings;
forwarding the received packet from the port where the packet is received to an output buffer of each output port on the switch;
transmitting a receive enable signal to a selected one of the output buffers, wherein said selected output buffer corresponds to said determined port;
determining whether a respective output buffer receives the receive enable signal;
in response to the respective output buffer not receiving the receive enable signal, discarding the received packet from the respective output buffer;
in response to the respective output buffer receiving the receive enable signal, storing the received packet at the respective output buffer; and
sending the packet over the network by forwarding the packet from said determined port.

2. The method of claim 1, wherein the set of routings for a port is stored in a routing table.

3. The method of claim 2, wherein each port in the switch includes its own routing table for storing the set of routings associated with the port.

4. The method of claim 1, wherein said routings map destination identifiers to output ports, and said method further comprises:
extracting a destination identifier from the received packet; and using the extracted destination identifier to access the set of routings.

5. The method of claim 4, wherein the set of routings indicates that certain destination identifiers are invalid for a port, and the method further comprises discarding a packet received at the port if the destination identifier extracted from the packet is indicated as invalid.

6. The method of claim 5, wherein a control bit is included in the set of routings for each destination identifier to indicate whether or not the destination identifier is valid for that particular port.

7. The method of claim 5, wherein the set of routings for a port indicates that a destination identifier is invalid for that port by identifying the port that received the packet as the output port.

8. The method of claim 5, wherein sets of routings for different ports indicate different destination identifiers as invalid.

9. The method of claim 4, wherein sets of routings for different ports indicate different output ports for a packet having a given destination identifier.

10. The method of claim 1, wherein the port at which the packet is received routes the packet through a switching matrix to reach said determined output port.

11. The method of claim 1, further comprising authenticating a source identifier in said received packet.

12. The method of claim 1, wherein said switch supports the InfiniBand architecture.

13. A switch for use in a communications network, the switch comprising:
multiple ports for connection to the network;
a stored set of routings in each of said multiple ports, wherein the set of routings stored in each port is specific to the port in which the set of routings is contained; and
control logic operable to receive a packet at a port in the switch, access the set of routings corresponding to the port at which the packet was received, and determine a port from which to forward the packet from the switch in accordance with said set of routings:
wherein the switch forwards the received packet from the port where the packet is received to an output buffer of each output port on the switch and transmits a receive enable signal to a selected one of the output buffers, wherein said selected output buffer corresponds to said determined port,
wherein a respective output buffer further comprises:
a determination mechanism configured to determine whether the output port receives the receive enable signal;
a discarding mechanism configured to discard the received packet in response to not receiving the receive enable signal; and
a storage mechanism configured to store the received packet in response to receiving the received enable signal.

14. The switch of claim 13, wherein the set of routings for a port is stored in a routing table.

15. The switch of claim 14, wherein each port in the switch includes its own routing table for storing the set of routings associated with the port.

16. The switch of claim 13, wherein said routings map destination identifiers to output ports, and said control logic is further operable to extract a destination identifier from the received packet and to use the extracted destination identifier to access the set of routings.

17. The switch of claim 16, wherein the set of routings may indicate that certain destination identifiers are invalid for a port, wherein a packet received at the port is discarded if the destination identifier extracted from the packet is indicated as invalid.

18. The switch of claim 17, wherein a control bit may be included in the set of routings for each destination identifier to indicate whether or not the destination identifier is valid for that particular port.

19. The switch of claim 17, wherein the set of routings for a port indicates that a destination identifier is invalid for that port by identifying the port that received the packet as the output port.

20. The switch of claim 17, wherein sets of routings for different ports indicate different destination identifiers as invalid.

21. The switch of claim 16, wherein sets of routings for different ports indicate different output ports for a packet having a given destination identifier.

22. The switch of claim 13, wherein the port at which the packet is received routes the packet through a switching matrix to reach said determined output port.

23. The switch of claim 13, wherein a source identifier in said received packet is authenticated.

24. The switch of claim 13, wherein said switch supports the InfiniBand architecture.

25. A non-transitory computer readable storage medium storing program instructions that, when executed by a computer, cause the computer to perform a method of operating a switch in a communications network, the method comprising: storing a set of routings in each port in a switch, wherein the set of routings stored in each port is specific to the port in which the set of routings is contained; receiving a packet at a port in the switch; accessing the set of routings corresponding to the port at which the packet was received and determining a port from which to forward the packet from the switch in accordance with the set of routings; forwarding the received packet from the port where the packet is received to an output buffer of each output port on the switch; transmitting a receive enable signal to a selected one of the output buffers, wherein the selected output buffer corresponds to the determined port, determining whether a respective output buffer receives the receive enable signal; in response to the respective output buffer not receiving the receive enable signal, discarding the received packet from the respective output buffer; in response to the respective output buffer receiving the receive enable signal, storing the received packet at the respective output buffer; and sending the packet over the network by forwarding the packet from the determined port.

26. A multi-port InfiniBand switch that detects a destination of an incoming packet and compares the detected destination to known destinations in order to determine an output port of the switch for retransmission of the packet, wherein data regarding known destinations is maintained in each port of the switch, wherein the data regarding known destinations maintained in each port is specific to the port in which the set of routings is contained, and wherein the switch forwards the received packet from an input port to an output buffer of each output port on the switch and transmits a receive enable signal to a selected one of the output buffers, wherein said selected output buffer corresponds to said determined output port, wherein a respective output buffer further comprises:
a determination mechanism configured to determine whether the output port receives the receive enable signal;
a discarding mechanism configured to discard the received packet in response to not receiving the receive enable signal; and
a storage mechanism configured to store the received packet in response to receiving the received enable signal.

27. The switch of claim 26, wherein the data regarding known destinations is maintained in a forwarding table for each port.

28. The switch of claim 27, wherein each table is stored in a memory proximal its respective input port.

29. An InfiniBand switch comprising:
a plurality of port pairs, each port pair comprising an input port and an output port;
wherein each input port comprises a retriever for retrieving a destination address from a received packet and a comparator for comparing the retrieved destination address to known destination addresses to select a target output port for the packet, wherein data regarding known destination addresses is stored in each input port, wherein the data regarding known destinations addresses stored in each input port is specific to the port in which the set of routings is contained;
wherein the input port is operable to route a packet through a matrix of connections between port pairs to reach its selected target output port; and
wherein the input port is operable to transmit a packet to an output buffer for each output port and to transmit a receive enable signal to a selected one of the output buffers corresponding to the selected target output port,
wherein a respective output buffer further comprises:
a determination mechanism configured to determine whether the output port receives the receive enable signal;
a discarding mechanism configured to discard the received packet in response to not receiving the receive enable signal; and
a storage mechanism configured to store the received packet in response to receiving the received enable signal.

30. The switch of claim 29, wherein data regarding known destination addresses is stored as a table comprising a list of destination addresses, each associated with an output port of the switch.

* * * * *